United States Patent [19]

Margetts et al.

[11] 4,004,658
[45] Jan. 25, 1977

[54] SLIDING CALIPER RETAINING MECHANISM FOR A DISC BRAKE

[75] Inventors: Hugh Genville Margetts, Shipston on Stour; Gordon Alfred Habgood, Leamington Spa, both of England

[73] Assignee: Girling Limited, Birmingham, England

[22] Filed: Oct. 21, 1975

[21] Appl. No.: 624,472

Related U.S. Application Data

[63] Continuation of Ser. No. 452,133, March 18, 1974, abandoned.

[30] Foreign Application Priority Data

Mar. 17, 1973 United Kingdom ............ 12969/73

[52] U.S. Cl. .............................. 188/73.5; 188/72.4
[51] Int. Cl.² ....................................... F16D 55/224
[58] Field of Search ................ 188/73.5, 73.3, 72.4

[56] References Cited

UNITED STATES PATENTS

| | | | |
|---|---|---|---|
| 3,616,879 | 11/1971 | Pauwels | 188/73.3 |
| 3,625,314 | 12/1971 | Rinker | 188/73.5 |
| 3,782,508 | 1/1974 | Cook | 188/73.5 |
| 3,782,509 | 1/1974 | Cook et al. | 188/73.5 |
| 3,838,753 | 10/1974 | Kestermeier | 188/73.3 |
| 3,917,033 | 11/1975 | Rath et al. | 188/73.3 |

FOREIGN PATENTS OR APPLICATIONS

| | | | |
|---|---|---|---|
| 1,286,845 | 1/1969 | Germany | 188/73.3 |

Primary Examiner—Trygve M. Blix
Assistant Examiner—Edward R. Kazenske
Attorney, Agent, or Firm—Scrivener Parker Scrivener and Clarke

[57] ABSTRACT

In a disc brake of slidable-caliper reaction type of the caliper is located in a gap between spaced arms in a stationary member, and a resilient blade spring acts between one end of the caliper and one of the arms. The blade spring is interposed between the caliper and a key engaging with the stationary member, and the blade spring is provided with spaced tags which engage with opposite ends of the one arm to prevent the key from moving with respect to the stationary member.

12 Claims, 10 Drawing Figures

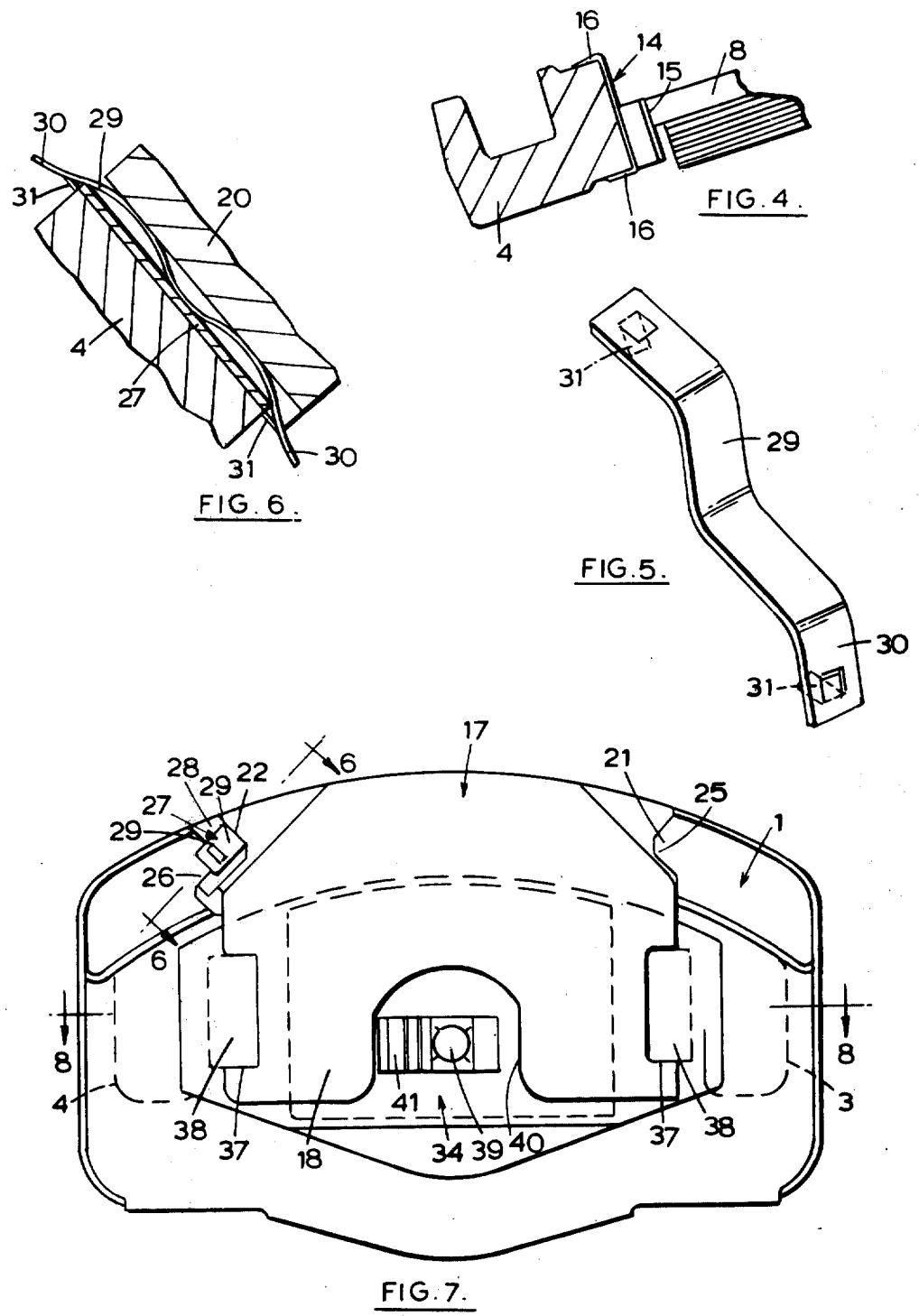

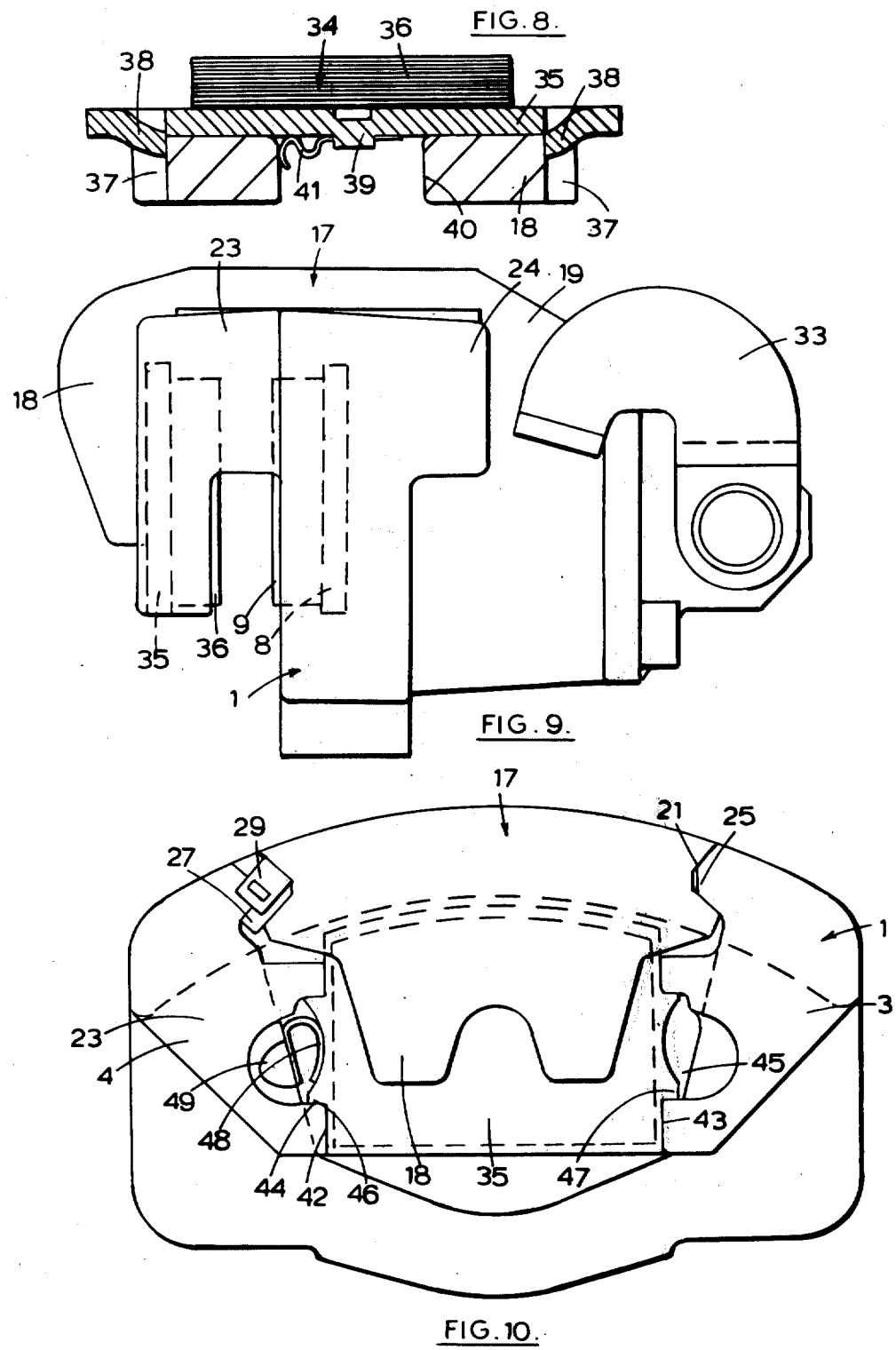

SLIDING CALIPER RETAINING MECHANISM FOR A DISC BRAKE

This is a continuation of application Ser. No. 452,133 filed Mar. 18, 1974 now abandoned.

This invention relates to disc brakes for vehicles of the kind in which friction pad assemblies for engagement with opposite faces of a rotatable disc are located in a caliper which straddles the periphery of the disc and is guided for axial sliding movement with respect to the disc in a drag-taking member, one friction pad assembly, known as the directly actuated friction pad assembly, being applied directly to one face of the disc by actuating means housed in an adjacent limb of the caliper, and the other friction pad assembly, known as the indirectly actuated friction pad assembly, being applied to the opposite face of the disc by the reaction of the actuating means which causes the caliper to slide axially with respect to the stationary member.

According to our invention, in a disc brake of the kind set forth for vehicles, the caliper is located in a gap defined between circumferentially spaced arms in the drag-taking member, and one end of the caliper is urged at all times into direct sliding engagement with one of the arms by means of an elongate resilient member acting between the opposite end of the caliper and a key which is interposed between that end of the caliper and the arm at that end of the brake and which is adapted to prevent movement of the caliper in a radial direction with respect to the drag-taking member, opposite ends of the elongate resilient member being deformed into engagement with axially disposed opposite ends of the arms to prevent the key from moving with respect to the drag-taking member as the caliper is moved axially in the application of the brake.

Normally the resilient member is located at the end of the brake opposite to that at which the drag from the caliper is to be transmitted to the drag-taking member in the normal forward direction of disc rotation. Thus, the faces through which the drag is transmitted to the drag-taking member are normally biassed into engagement to facilitate operation of the brake and reduce operational impact noises to a minimum.

Conveniently, the resilient member comprises a spring blade of sinuous outline and tags pierced from the blade adjacent to opposite ends thereof define retaining lugs for engagement with opposite ends of the arm.

By deforming one tag from its engagement with the arm, the spring blade and the key can be withdrawn from the brake in an axial direction, whereafter the caliper, which is of a circumferential dimension slightly smaller than that of the circumferential spacing of the arms, can be removed from the drag-taking member in a radial direction.

The arms may be continuous with extensions which extend over the peripheral edge of the disc to define drag-taking abutments for the indirectly friction pad assembly.

The directly actuated friction pad assembly may also be guided between the circumferentially spaced arms, being urged directly into engagement with one arm at all times by resilient means which acts between the opposite end of the pad assembly and the other arm, and which are keyed to the arm against movement relative thereto.

Preferably, the engagements between the directly actuated friction pad assembly, the arms, and the resilient means are constructed and arranged normally to prevent movement of the directly actuated friction pad assembly in a radial direction with respect to the drag-taking member.

Preferably the resilient means is located at the end of the brake opposite to that at which the drag is transmitted from the directly actuated friction pad assembly to the drag-taking member when the brake is applied with the disc rotating in a normal forward direction. Thus, the surfaces which normally engage when the brake is applied are normally resiliently biassed into engagement to reduce to a minimum operational clearances.

The opposed end portions of the indirectly actuated friction pad assembly may be displaced axially to engage in complementary recesses in a limb of the caliper which provides a support for that friction pad assembly. This locates the indirectly actuated friction pad assembly against movement with respect to the caliper in both an axial and a radial direction.

Preferably a spring acts between the limb and the indirectly actuated friction pad assembly to urge one of the deformed end portions into engagement at all times with the base of the recess in which it is received. This eliminates rattle.

It is preferably to arrange for the spring to urge into engagement the surfaces by which the drag on an indirectly actuated friction pad assembly is transmitted to the caliper when the brake is applied with the disc rotating in a normal forward direction.

Some embodiments of our invention are illustrated in the accompanying drawings in which:-

FIG. 4 is a fragmentary section on the line 4—4 of FIG. 3;

FIG. 5 is a perspective view of the elongate resilient member comprising biassing means for the caliper;

FIG. 6 is a section on the line 6—6 of FIG. 7;

FIG. 7 is an elevation of the end of the brake incorporating the indirectly actuated friction pad assembly;

FIG. 8 is a section on the line 8—8 of FIG. 7;

FIG. 9 is a side elevation similar to FIG. 1 but including a modification; and

FIG. 10 is an elevation of the end of the disc brake illustrated in FIG. 9 containing the indirectly actuated friction pad assembly.

Figure 1:
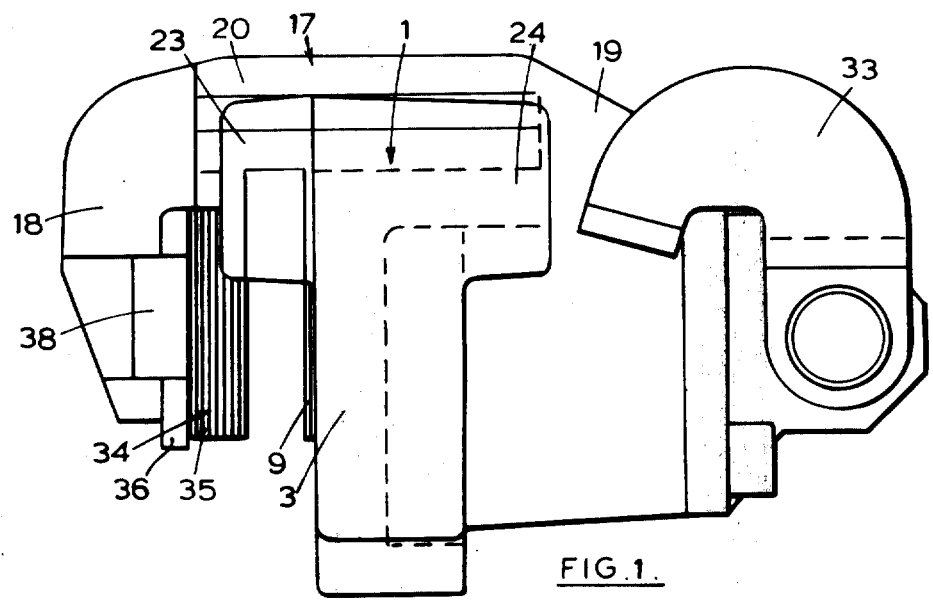
FIG. 1 is a side elevation of a disc brake for a vehicle.
Figure 2:
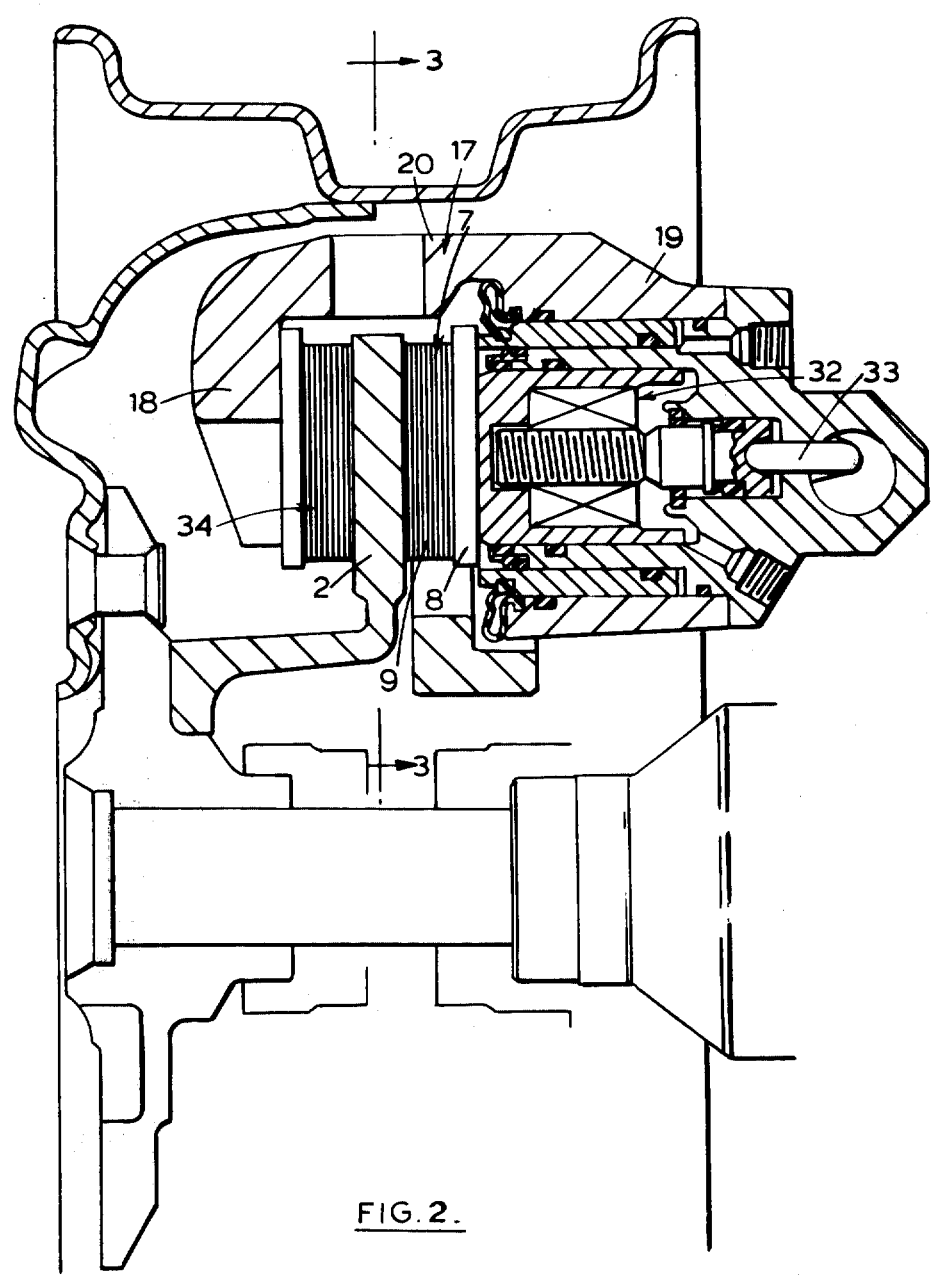
FIG. 2 is a longitudinal section through the disc brake of FIG. 1.
Figure 3:
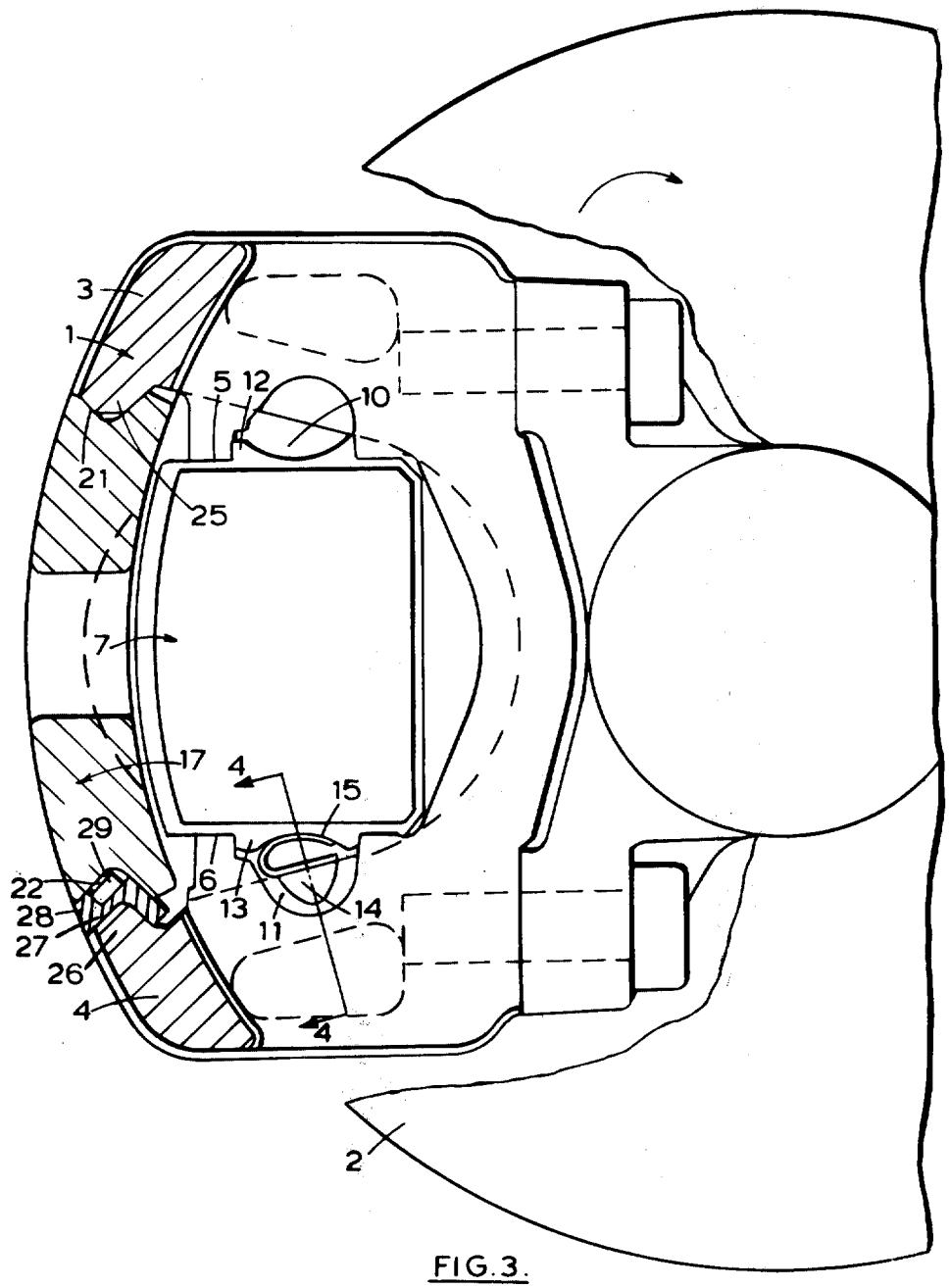
FIG. 3 is a section on the line 3—3 of FIG. 2.

The disc brake illustrated in FIGS. 1 to 8 of the accompanying drawings comprises a stationary drag taking member 1 which is mounted on a fixed part adjacent to the inboard side of a rotatable disc 2. The stationary member includes a pair of circumferentially spaced arms 3,4 which extend radially beyond the peripheral edge of the disc 2. Portions of the inner surfaces of the arms 3, 4 which lie within the periphery of the disc comprise parallel surfaces 5 and 6 between which are slidably guided end edges of a directly actuated friction pad assembly 7. The directly actuated friction pad assembly 7 comprises a rigid backing plate 8 slidably engaged with the guiding surfaces 5, 6 and carrying a pad 9 of friction material for engagement with an adjacent face of the disc 2. At aligned intermediate points in their lengths the guiding surfaces 5 and 6 are provided with recesses 10 and 11 of which the bases are inclined with respect to the guiding surfaces 5 and 6. Radially upper and lower faces of the recesses are in sliding engagement with upper and lower faces of projections 12 nad 13 on the backing plate 8 which extend into the recesses. Resilient means 14 are housed within the recess 11 and act between the base of the recess 11 and the base of an arcuate recess 15 in the projection 13 to urge the directly actuated friction pad assembly into engagement with the guiding surface 5. The guiding surface 5 acts as an abutment to take the drag on the directly actuated friction pad 7 when the brake is applied with the disc rotating in a normal forward direction as illustrated by the arrow in FIG. 3 of the drawings.

The resilient means 14 comprise a metal strip of a width equal to the axial length of the arm 4 provided at one end with outwardly directed tabs 16 which are deformed to a position normal to the plane of the strip to embrace opposite ends of the arm 4. The remainder of the strip is deformed back on itself in a direction away from the tabs 16 to conform to the contour of the arcuate recess 15.

A caliper 17 of generally U-shaped outline comprising axially spaced limbs 18 and 19 connected by integral bridge piece 20 straddles the disc and is received in a gap defined between the portions of the spaced arms 3 and 4 which lie outside the periphery of the disc. Circumferentially outermost ends of the bridge piece 20 are formed with axially extending outwardly directed grooves 21, 22.

The portions of the arms 3 and 4 which lie outside the periphery of the disc are integral with forward and rearwardly extending integral extensions 23 and 24. The inner face of the portion of the arm 3 which lies outside the periphery of the disc and the faces of the extensions which are continuous therewith are formed with the projection 25 of generally Vee outline adapted to be received in the complementary groove 21 at that end of the bridge piece 20. The inner surface of the opposite end of the brake are similarly formed as a projection 26 of generally Vee outline. The relative spacings and dimensions of the grooves 21,22 and the projections 25 and 26 are chosen so that the caliper 17 can be mounted on and detached from the stationary member 1 in a radial direction. This is achieved by engaging the groove 21 with the projection 25 on the stationary member 1 at that end of the brake and swinging the caliper 17 angularly into the position in which the projection 26 and the groove 22 at the opposite end of the brake are superimposed. In this position there is a clearance between the base of the groove 22 and the projection 26.

A key in the form of a slipper 27 of generally Z-outline is adapted to be slid axially between the base of the recess 22 and the complementary surface of the projection 26 on the arm 4 and the extensions 23 and 24 to key the caliper 17 against movement with respect to the stationary member 1 in a radial direction. Thus, the opposite ends of the bridge piece 20 are guided between the arm 3 and a projection 28 at the outer circumferentially innermost end of the slipper 27. Normally the caliper 17 is urged into engagement with the arm 3 by means of an elongate resilient member 29 whic is of sinuous outline and which is interposed between the slipper 27 and the recesses 22 in the bridge piece 20. The resilient member 29 comprises a strip of metal of which end portions 30 which project from axially spaced opposite ends of the arms incorporate tags 31 which are pierced from the metal and engage with opposite ends of the extensions 23 and 24 to maintain the slipper 27 against movement with respect to the stationary member 1 as the caliper 17 is moved axially with respect to the disc 2 in the application of the brake.

The limb 19 of the caliper incorporates hydraulic actuating means 32 and mechanical actuating means 33 for applying the directly actuated friction pad assembly 7 to the disc.

The opposite limb 18 of the caliper carries an indirectly actuated friction pad assembly 34 comprising a rigid backing plate 36 carrying a pad 35 of friction material. The end edges of the limb 18 are formed with outwardly directed notches 37 in which are received complementary abutment portions 38 which are deformed from the material of the backing plate 35 to engage with the base and upper and lower edges of each notch 37. The engagement of the abutment portions 38 in the notches 37 retains the indirectly actuated friction pad assembly 34 against movement with respect to the caliper 17 in both a radial and a circumferential direction. The backing plate 36 incorporates an axial projection 39 which is received in an opening 40 of substantial dimensions in the limb 18. The axial projection carries a spring 41 in the form of a corrugated plate acting on one face of the opening 40 to urge the abutment portion 38 at the end of the brake corresponding to the arm 4 into engagement with the base of the notch 37 in which it is received.

When the brake is applied either hydraulically or mechanically the directly actuated friction pad 7 is urged directly into engagement with one face of the disc 2 and the reaction causes the caliper to slide in the opposite direction with respect to the stationary member 1 to urge the indirectly actuated friction pad assembly 34 into engagement with the opposite face of the disc.

In the normal direction of forward disc rotation shown in the drawings, the drag on the directly actuated friction pad assembly 7 is taken directly on the guiding surface 5 in the stationary member into engagement with which that friction pad assembly 7 is normally urged by the resilient means 14. Similarly, the drag on the indirectly actuated friction pad is taken at the base of the notch 37 into which the abutment portion 38 is normally urged by the spring 41. The drag on the indirectly actuated friction pad assembly 34 is then transferred through the caliper 17 onto the inner face of a portion of the arm 3 and the extensions 23 and 24 which lie outside the periphery of the disc and into engagement with which the caliper 17 is normally urged by the resilient member 27.

When the brake is applied with the disc rotating in the opposite direction the resilient means 14 are compressed slightly to enable the drag on the directly actuated friction pad 7 to be taken by the guiding surface 6. Similarly, the resilient means 41 compress to allow the drag from the directly actuated friction pad assembly 34 to be transmitted to the arm 4 through the slipper 27 and the projection 28 with which the caliper 17 engages directly.

To remove the caliper 17 from the brake, one of the tags 31 of the resilient member 29 is bent back towards the plane of the strip or alternatively, the strip is deflected circumferentially to enable it to be disengaged from the end of the arm 4 and the extension. The resilient member 29 and the slipper 27 can then be withdrawn axially from the brake to enable the caliper 17 to be removed as described above.

In the embodiment of FIGS. 9 and 10 the extension 23 of the arms 3 and 4 is extended axially and radially to define spaced abutment surfaces 42 and 43 between which opposite ends of the backing plate 35 of the indirectly actuated friction pad assembly 34 are slidably guided. The abutment surfaces 42,43 are formed at intermediate points in their lengths with recesses 44 and 45 in which are received projections 46 and 47 at opposite ends of the backing plate 35. The backing plate 35 is urged by resilient means 48 into engagement with the abutment surfaces 43 at the end of the stationary member 1 to which drag from the indirectly actuated friction pad assembly 34 will be transmitted when the brake is applied with the disc rotating in a normal direction of forward rotation. The resilient means 48 are identical with the resilient means 14 which bias the directly actuated friction pad 7 and incorporate spaced tabs 49 engaging with opposite ends of the extension 23 of the arms. In this embodiment the limb 18 of the caliper 17 abuts against the backing plate 35.

The construction and operation of the brake illustrated in FIGS. 9 and 10 is otherwise the same as that described above with reference to FIGS. 1 to 8 and corresponding reference numerals have been applied to corresponding parts.

The hydraulic and mechanical actuating means need not be described further.

We claim:

1. A disc brake for a vehicle comprising a rotatable disc having a peripheral edge, a drag-taking member adjacent to said disc, a caliper having spaced limbs straddling said peripheral edge of said disc and which are symmetrical with respect to a radius of said disc, friction pad assemblies for engagement with opposite faces of said disc located in said caliper, actuating means housed in one of said limbs for applying one of said friction pad assemblies directly to an adjacent face of said disc, the other of said friction pad assemblies being applied indirectly to the opposite face of said disc by the reaction of said actuating means which causes said caliper to slide axially with respect to said drag-taking member, circumferentially spaced arms in said drag-taking member having axially spaced opposite ends, inner faces of said arms defining therebetween a gap in which said caliper is located, said caliper having circumferentially spaced opposite end faces adjacent said inner faces of said arms, a key of a length substantially equal to that of said arms interposed between one of said opposite end faces and said inner face of one of said arms, and an elongate resilient member interposed between the said one end face and said key over the total length thereof to urge the other of said opposite end faces into direct sliding engagement with the other of said inner faces, said elongate resilient member being substantially flat at least in a transverse direction and being provided at opposite ends with spaced tags which straddle opposite ends of said key and project in a direction away from said caliper by a distance greater than the distance between said resilient member and the said one of the said arms to engage with said axially spaced opposite ends of the said one of said arms to prevent said key from moving with respect to said drag-taking member as said caliper is moved axially in the application of the brake, said elongate member comprising sole means for locating said key in said brake with respect to said drag-taking member and said tags being urged out of engagement with said arm to permit said key and said resilient member to be withdrawn from said brake in an axial direction, wherein said one of said opposite end faces of said caliper is formed with an axially extending outwardly directed groove of generally V outline comprising inner and outer relatively inclined surfaces, said inner face of said one at said arms is formed with a complementary projection of generally V outline comprising inner and outer relatively inclined surfaces spaced respectively from said inner and outer surfaces of said groove, said key has on one side first and second relatively inclined abutment surfaces which engage slidably with said inner and outer surfaces of said projection and on an opposite side a third abutment surface spaced from and parallel with said outer surface of said groove, and said resilient member acts between said third abutment surface and said outer surface of said groove, and wherein said key includes a projection equal in length to that of said key, said key projection extending from the said opposite side of said key towards the said outer surface of said groove and having an inner edge between which and said inner surface of said groove is defined a clearance gap in which said resilient member is located.

2. A disc brake as claimed in claim 1, wherein said resilient member comprises a spring blade of sinuous outline and said tags are pierced from said blade adjacent to opposite ends thereof.

3. A disc brake as claimed in claim 1, wherein the circumferential dimension of said caliper is smaller than the circumferential spacing between said arms to permit said caliper to be removed from said drag-taking member in a radial direction after said key and said resilient member have first been withdrawn from said brake.

4. A disc brake as claimed in claim 1, wherein said arms are continuous with extensions which extend over said peripheral edge of said disc to define drag-taking abutments for said friction pad assembly which is adapted to be applied indirectly to said disc.

5. A disc brake as claimed in claim 1, wherein said friction pad assembly which is adapted to be applied directly to said disc is guided between said circumferentially spaced arms, and resilient means acting between one end of the said friction pad assembly and the said one of said arms acts to urge the opposite end of said friction pad assembly into engagement with the other of said arms, means being incorporated for keying said resilient means to the said one arm against movement relative thereto.

6. A disc brake as claimed in claim 1, wherein end portions of said friction pad assembly which is adapted to be applied indirectly to said disc are displaced axially to engage in complementary recesses in the one of said spaced limbs which provides a support for that friction pad assembly.

7. A disc brake as claimed in claim 6 wherein each recess has a base and a spring acts between the said one limb and the said friction pad assembly to urge one of said end portions into engagement at all times with said base of said recess in which it is received.

8. A disc brake as claimed in claim 7, wherein said spring is adapted to urge into engagement said surfaces by which the drag on the friction pad assembly is transmitted to said caliper when the brake is applied with said disc rotating in a normal forward direction.

9. A disc brake as claimed in claim 1, wherein said friction pad assembly which is adapted to be applied indirectly to said disc is slidably guided between spaced abutment surfaces on inwardly directed radial extensions of said arms.

10. A disc brake as claimed in claim 9, wherein a spring acts between one of said extensions and one end of the said friction pad assembly to urge the opposite end of the said friction pad assembly into engagement with the one of the said abutment surfaces at that end of the brake.

11. A disc brake as claimed in claim 10, wherein said spring acts in a direction to urge the said friction pad assembly into engagement with the arm which takes the drag on the said friction pad assembly when the brake is applied with the disc rotating in a normal forward direction.

12. A disc brake for a vehicle comprising a rotatable disc having a peripheral edge, a drag-taking member adjacent to said disc, a caliper having spaced limbs straddling said peripheral edge of said disc and which are symmetrical with respect to a radius of said disc, friction pad assemblies for engagement with opposite faces of said disc located in said caliper, actuating means housed in one of said limbs for applying one of said friction pad assemblies directly to an adjacent face of said disc, the other of said friction pad assemblies being applied indirectly to the opposite face of said disc by the reaction of said actuating means which causes said caliper to slide axially with respect to said drag-taking member, circumferentially spaced arms in said drag-taking member having axially spaced opposite ends, inner faces of said arms defining therebetween a gap in which said caliper is located, said caliper having circumferentially spaced opposite end faces adjacent said inner faces of said arms, a key of a length substantially equal to that of said arms interposed between one of said opposite ends faces and said inner face of one of said arms, and an elongate resilient member interposed between the said one end face and said key over the total length thereof to urge the other of said opposite end faces into direct sliding engagement with the other of said inner faces, said elongate resilient member being substantially flat at least in a transverse direction and being provided at opposite ends with spaced tags which straddle opposite ends of said key and project in a direction away from said caliper by a distance greater than the distance between said resilient member and the said one of the said arms to engage with said axially spaced opposite ends of the said one of said arms to prevent said key from moving with respect to said drag-taking member as said caliper is moved axially in the application of the brake, said elongate member comprising sole means for locating said key in said brake and with respect to said drag-taking member and said tags being urged out of engagement with said arm to permit said key and said resilient member to be withdrawn from said brake in an axial direction, and wherein each of said opposite end faces of said caliper is formed with an axially extending outwardly directed groove of generally V outline comprising inner and outer relatively inclined surfaces, said inner face of each of said arms is formed with a complementary projection of generally V outline comprising inner and outer relatively inclined surfaces, one of said projections is engaged by said inner and outer surfaces of one of said grooves in which the said one projection is received, the other of said projections is spaced from said inner and outer surfaces of the other of said grooves, said key has on one side first and second relatively inclined abutment faces engaging slidably with said inner and outer surfaces of the said other of said projections and on an opposite side a third abutment surface spaced from and parallel with said outer surface of the said other of said grooves, and said resilient member acts between said third abutment surface and the said last mentioned outer surface, and wherein said key includes a projection equal in length to that of said key, said key projection extending from the said opposite side of said key towards the said last mentioned outer surface of said caliper and having an inner edge between which and said inner surface of the other of said grooves is defined a clearance gap in which said resilient member is located.

* * * * *